United States Patent [19]

Hori et al.

[11] Patent Number: 4,590,491

[45] Date of Patent: May 20, 1986

[54] THERMAL TRANSFER PRINTER

[75] Inventors: Yasuro Hori, Katsuta; Nobuo Abe, Ibaraki, both of Japan

[73] Assignee: Hitachi, Ltd., Tokyo, Japan

[21] Appl. No.: 618,256

[22] Filed: Jun. 7, 1984

[30] Foreign Application Priority Data

Jun. 9, 1983 [JP] Japan .................................. 58-101653

[51] Int. Cl.⁴ ................................................. H05B 3/00
[52] U.S. Cl. .................................. 346/76 PH; 400/120
[58] Field of Search ........................ 346/76 PH, 76 R; 219/216 R, 216 PH; 400/120

[56] References Cited

U.S. PATENT DOCUMENTS

| 4,168,421 | 9/1979 | Ito ........................................ 219/216 |
| 4,447,819 | 5/1984 | Moriguchi et al. ............ 346/76 PH |
| 4,449,136 | 5/1984 | Moriguchi et al. ............ 346/76 PH |

Primary Examiner—E. A. Goldberg
Assistant Examiner—A. Evans
Attorney, Agent, or Firm—Antonelli, Terry & Wands

[57] ABSTRACT

In a thermal transfer printer of the type wherein pigment or dye on the thermal transfer paper is transferred onto the recording paper by means of a thermal print head, a plurality of current pulses having a sufficiently small time width are seriated closely to produce a contiguous current supplied to each of thermal elements of the print head. It is detected whether any current pulse flows at least in one of the thermal elements, and the current conducting operation is terminated when none of the thermal elements is found to conduct the current pulse. The printer can terminate the recording operation in the course of any line that none of the thermal elements conducts the current any longer, and proceed to the recording operation for the next line, whereby the printing time can be reduced.

12 Claims, 5 Drawing Figures

THERMAL TRANSFER PRINTER

BACKGROUND OF THE INVENTION

The present invention relates to a thermal transfer printer and, particularly, to a thermal transfer printer suitable for printing an intermediate-tone picture in a short time.

In order for the conventional thermal transfer printer to produce an intermediate-tone picture, it is necessary to vary the thermal energy applied to the thermal print head, and this is accomplished in general by varying the duration of the current flowing in the thermal elements of the print head.

SUMMARY OF THE INVENTION

It is an object of the present invention to provide a thermal transfer printer capable of printing an intermediate-tone picture in a short time.

The present invention resides in a thermal transfer printer which prints a picture on a recording paper through the heat of the thermal print head, wherein a plurality of current pulses having a sufficiently small time width are seriated closely to determine the duration of the current conducted to each thermal element of the print head, and wherein means are provided to check that a current flows in at least one of the thermal elements of the print head and to terminate the current conducting operation or step for that line, i.e., the printing operation for that line, if none of the thermal elements is found to conduct the current.

BRIEF DESCRIPTION OF THE DRAWINGS

The present invention will be more apparent from the following detailed description taken in conjunction with the accompanying drawings, in which.

DESCRIPTION OF THE PREFERRED EMBODIMENTS

Figure 1:
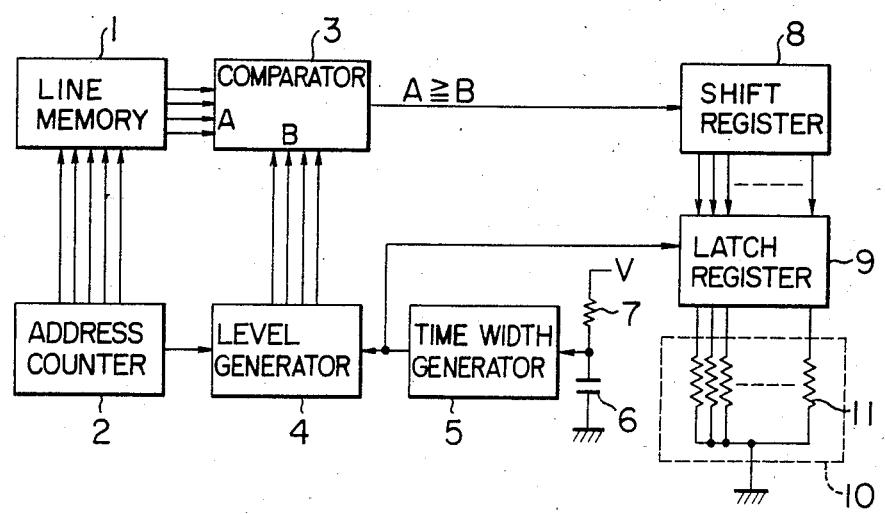
FIG. 1 is a block diagram of the control circuit of the thermal transfer printer which was tried in the examination of the present invention.

The trial arrangement of the present invention will first be described with reference to FIG. 1. The arrangement includes a line memory 1, an address counter 2, a comparator 3, a level generator 4, a time width generator 5, a capacitor 6, a resistor 7, a shift register 8, a latch register 9, a thermal print head 10, and thermal elements 11 of the print head.

The thermal transfer printer is designed to transfer the pigment or dye on the thermal transfer paper onto the recording paper by means of a thermal print head 10, and the functional blocks 1 through 9 constitute means for seriating closely a plurality of current pulses having a sufficiently small time width to form a current conducted to each thermal element 11 of the print head 10.

The line memory 1 stores signals representing tonetic information for one line which is constituted by a plurality of dots corresponding to the thermal elements of the print head 10, and the memory is addressed by the address counter 2 to provide each tonetic signal to the input A of the comparator 3, which has another input B for receiving from the level generator 4 the comparison tone levels in the ascending order. The comparator 3 compares the signal levels on its inputs A and B, and provides an active signal to the shift register 8 when the signal level at A is larger than or equal to that at B. This operation is repeated the number of times as many as that of the thermal elements constituting one line. Upon completion of comparison for the first comparison tone level of one line, the resultant data accumulated in the shift register 8 is held in the latch register 9 so that currents are kept flowing selectively in corresponding thermal elements 11 of the print head 10. In the meantime the level generator 4 provides the next comparison tone level so that the same line data are compared with the higher tone level, and the results are successively accumulated into the shift register 8.

Accordingly, the duration of this operation for each comparison tone level is determined by the time width generator 5 based on the values of the resistor 7 and capacitor 6. Upon expiration of the time length, the contents of the shift register 8 are latched by the latch register 9, and the level generator 4 provides the next comparison tone level.

Figure 2:
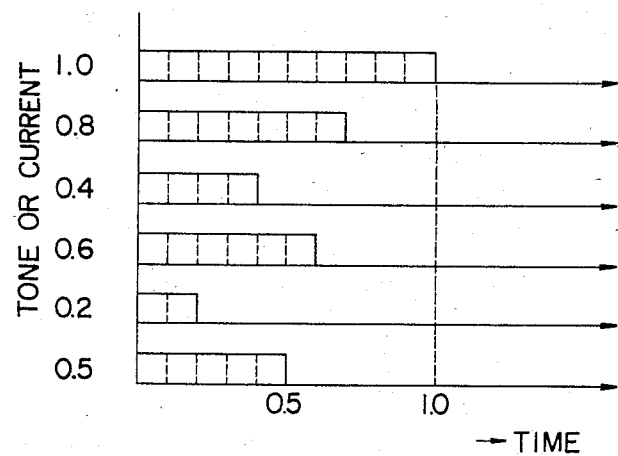
FIG. 2 is a set of waveform diagrams of currents produced by the arrangement shown in FIG. 1.

FIG. 2 shows the waveforms of currents flowing in the thermal elements 11 in the foregoing arrangement. In the example of FIG. 2, a plurality of unit current pulses are joined closely to produce a complete current in ten steps of tone level. For a tone level of 1.0, the thermal element is energized by all of ten unit current pulses, while for a tone level of 0.2, it is energized by only two advanced unit current pulses, whereby an intermediate-tone picture can be produced by thermal energy derived from variable-length current.

Producing the maximum tone level of 1.0 requires a time length of 1.0, which is added by a certain head cooling time to complete a full printing time for one line. For high-speed printing, it is important to reduce the printing time per line. However, the arrangement of FIG. 1 operates to continue the sequence up to the full time of 1.0 whether the maximum concentration 1.0 is included or not in signals for one line. Therefore, a considerable amount of idle time is spent, printing of one complete picture takes a long time, and the number of prints produced is limited.

The present invention contemplates to improve the preceding thermal transfer printer so as to overcome the above-mentioned deficiencies. The inventive thermal transfer printer in several embodied forms will now be described with reference to the drawings.

Figure 3:
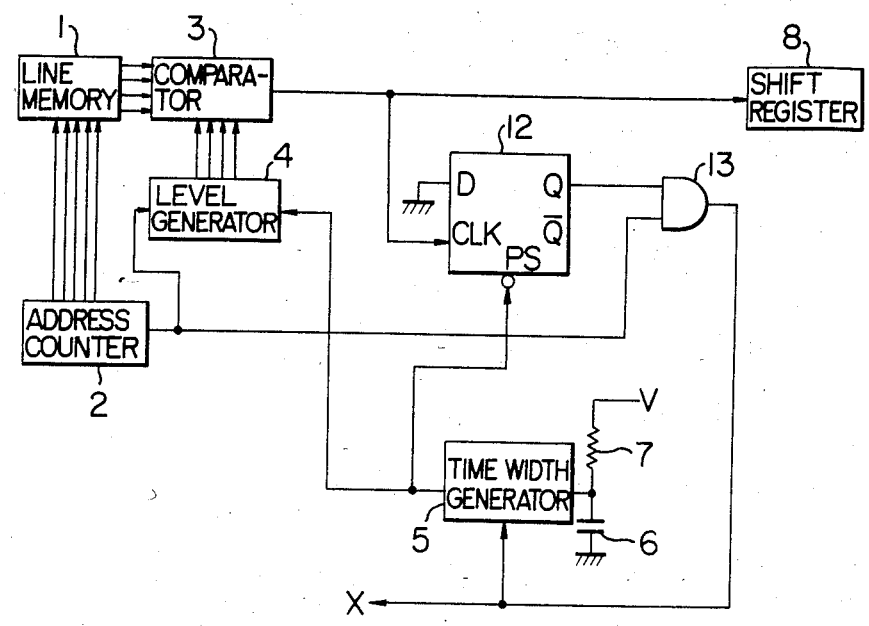
FIG. 3 is a block diagram of the printer control circuit embodying the present invention.

FIG. 3 shows in block form a printer control circuit embodying the present invention. The arrangement includes a flip-flop 12 and an AND gate 13 in addition to the same or equivalent constitutents to those of FIG. 1 as referred to by the common symbols 1 through 8. As can be seen from FIG. 3, the flip-flop 12 and AND gate 13 are inserted among the connections of the address counter 2, comparator 3, time width generator 5 and shift register 8 of FIG. 1, so that the active signals for energizing each thermal elements 11 of the print head 10 is detected. The flip-flop 12 is of a presettable type flip-flop, being preset by the output of the time width generator 5 to provide a "high" level state at its output Q. The comparator 3 provides an active signal at a certain tone level to the shift register 8. When the comparator 3 provides an active signal activating at least one thermal element 11, the rising edge of the active signal at the CLK input causes the flip-flop 12 to have a "low" level at the Q output while a "high" level at the $\bar{Q}$ output, reflecting a "low" level at the D input. Following the transfer of a tone level signal, the address counter 2 provides a "high" level pulse to one input of the AND gate 13. If the flip-flop 12 provides a "low" output at $\bar{Q}$ which is received by another input of the AND gate 13, the output of the AND gate 13 stays "low" and has no effect. On the other hand, if the flip-flop 12 remains "high", i.e., none of the thermal elements 11 is activated for one comparison tone level, the AND gate 13 produces a "high" output, which is used to halt the time width generator 5 so as to terminate the printing operation for that line, whereby the remaining time up to the highest tone level can be saved. The X output produced by the AND gate 13 may further be used, for example, as a reset signal which would be needed at the end of the printing operation for each line.

In printing a usual picture, particularly a color picture, it is a rare case to encounter signals representing the highest tone level for every line. In comparison with the existing print system where a full time frame for the highest tone level is spent invariably, the system of this embodiment can reduce the printing time from 30 ms to 24–15 ms, i.e., 20–50% reduction, for one print.

Figure 4:
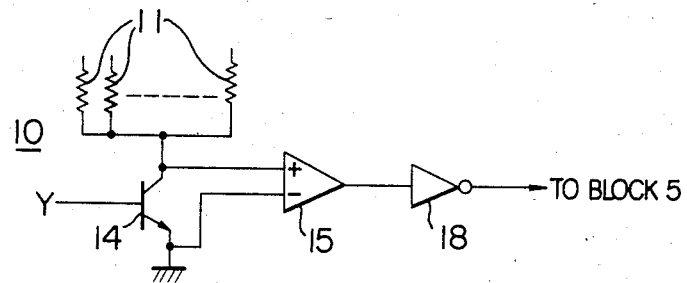
FIG. 4 is a block diagram of the printer control circuit according to another embodiment of the invention.

FIG. 4 shows in block form the printer control circuit according to another embodiment of the invention. In the figure, common reference numerals are used for the components identical to those shown in FIG. 1. The arrangement further includes a transistor 14, an operational amplifier 15 and an inverter 18. This embodiment is intended for detecting the current flowing in the thermal elements 11 of the print head 10, through the provision of a transistor 14 on the common line of the print head 10 so that all thermal elements 11 can commonly be activated or deactivated. The voltage across the transistor 14 is amplified by the operational amplifier 15 so that it is converted into a TTL (Transistor Transistor Logic) compatible signal, and the signal is fed through the inverter 18 and used as a one-line print end command signal to halt the time width generator 5.

In operation, when a current flows through any of the thermal elements 11, the transistor 14 develops a forward voltage drop, which is amplified by the operational amplifier 15 to yield a high TTL compatible signal, and then inverted to "low" by the inverter 18. When, on the other hand, no current flows through the thermal elements 11, the operational amplifier 15 provides 0 volt, causing the inverter 18 to produce a "high" output, which halts the time width generator 5 to complete one-line printing as mentioned above. Terminal Y shown in FIG. 4 receives the command for activating or deactivating a plurality of thermal elements, or one of groups of thermal elements. Thus, more than one transistor would be used when the thermal elements are divided into a plurality of groups. This embodiment is expected to achieve the similar effects to those of the previous embodiment.

Figure 5:
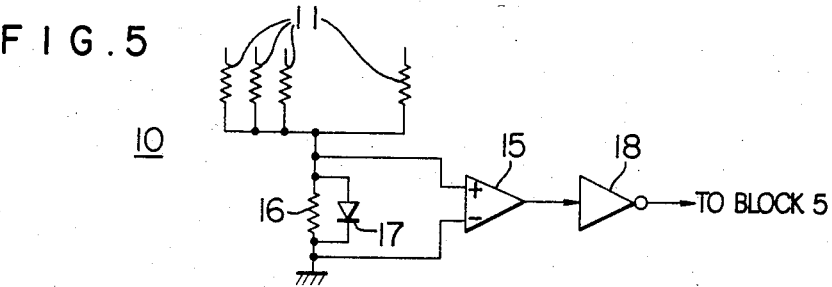
FIG. 5 is a block diagram of the printer control circuit according to still another embodiment of the invention.

FIG. 5 shows in block form the printer control circuit according to still another embodiment of the invention. In the figure, common reference numerals are used for the components identical to those shown in FIGS. 1 or 4. The arrangement includes a resistor 16 and a diode 17. This embodiment is identical to that of FIG. 4, except that the transistor 14 of FIG. 4 is replaced by a parallel connection of the resistor 16 and diode 17 provided on the common line of the thermal elements 11. The voltage across the resistor 16 is amplified by the operational amplifier 15 and fed through the inverter 18 to provide the one-line print end command used to halt the time width generator as described above. This embodiment is also expected to achieve the similar effects as those of the preceding embodiments.

Alternatively, a current sensing device having similar saturation voltage characteristics to those of the transistor 14 or diode 17 shown in FIGS. 4 or 5 may be employed, instead of the transistor or diode. When the operational amplifier 15 shown in FIGS. 4 and 5 is arranged to have output saturation characteristics for a large input, the transistor and diode are not required to have the above-mentioned characteristics.

According to the present invention, as described above, the printing operation for one line is terminated on detecting at any tone level that all of the thermal elements are not activated. On this account, remaining useless operating time up to the highest tone level can be be cut, and reduction in picture printing time by 20–50%, depending on the sort of picture, can be expected.

We claim:

1. A thermal transfer printer wherein pigment or dye on a thermal transfer paper is transferred to a recording paper by means of a thermal print head, said printer comprising means for seriating closely a plurality of current pulses having a sufficiently small time width to produce a current supplied to each of thermal elements of said print head for a printing operation; and means for detecting that any of said current pulses flows in at least in one of said thermal elements and for terminating the printing operation for said thermal elements when none of said thermal elements is found to conduct said current pulse.

2. A thermal transfer printer according to claim 1, wherein said means for detects an activation signal for supplying a current to each thermal element.

3. A thermal transfer printer according to claim 1, wherein said second-mentioned means comprises means for detecting a current conducted to each of said thermal elements.

4. A thermal transfer printer according to claim 3 wherein said means for detecting a current conducted to each of said thermal elements comprises a current sensor having saturation characteristics for a large current provided on the side of a common line of said print head.

5. A thermal transfer printer wherein a recording paper is printed by heating a thermal print head, said printer comprising means for seriating closely a plurality of current pulses having a sufficiently small time width to produce a current supplied to thermal elements of said print head for a printing operation; and means for detecting that any of said current pulses flows in at least one of said thermal elements and for terminating the printing operation for said thermal elements when none of said thermal elements is found to conduct said current pulse.

6. A thermal transfer printer for enabling printing of an intermediate tone image on a line-by-line basis, said printer comprising means for seriating closely a plurality of current pulses having a sufficiently small time width to produce a current supplied to thermal elements of a thermal print head for enabling a printing operation of one line of an image, and means for detecting whether any of the current pulses flows in at least one of said thermal elements and for terminating the printing operation for said thermal elements for printing of the one line when none of said thermal elements is found to conduct said current pulses, whereby printing of each line of a complete intermediate tone image is effected in a short time.

7. A thermal transfer printer according to claim 6, wherein said means for detecting includes means for initiating a current conducting operation for said thermal elements for printing the next line of the complete intermediate tone image when none of said thermal elements is found to conduct said current printing pulses and the current operation for said thermal elements for printing the one line is terminated.

8. A thermal transfer printer according to claim 6, wherein said means for detecting detects an activation signal for supplying a current to each thermal element.

9. A thermal transfer printer according to claim 6, wherein said means for detecting detects a current conducted to each of said thermal elements.

10. A thermal transfer printer according to claim 9, wherein said means for detecting a current conducted to each of said thermal elements includes a current sensor having saturation characteristics for a large current provided on the side of a common line of said thermal print head.

11. A thermal transfer printer according to claim 6, wherein said thermal print head serves for transferring pigment or die on a thermal transfer paper to a recording paper.

12. A thermal transfer printer according to claim 6, wherein said thermal print head serves for printing on a recording paper.

* * * * *